US011607909B2

(12) United States Patent
Rovito

(10) Patent No.: US 11,607,909 B2
(45) Date of Patent: Mar. 21, 2023

(54) UNIVERSAL TEMPORARY WHEEL

(71) Applicant: GUNIWHEEL, LLC, Alpharetta, GA (US)

(72) Inventor: Sergio Rovito, Alpharetta, GA (US)

(73) Assignee: Guniwheel, LLC, Alpharetta, GA (US)

(*) Notice: Subject to any disclaimer, the term of this patent is extended or adjusted under 35 U.S.C. 154(b) by 421 days.

(21) Appl. No.: 16/436,513

(22) Filed: Jun. 10, 2019

(65) Prior Publication Data
US 2020/0016928 A1 Jan. 16, 2020

Related U.S. Application Data

(60) Provisional application No. 62/684,001, filed on Jun. 12, 2018.

(51) Int. Cl.
| B60B 27/06 | (2006.01) |
| B60B 3/02 | (2006.01) |
| B60C 5/00 | (2006.01) |
| B60C 7/10 | (2006.01) |
| B60B 11/10 | (2006.01) |

(52) U.S. Cl.
CPC ........... B60B 27/065 (2013.01); B60B 3/02 (2013.01); B60B 11/10 (2013.01); B60C 5/00 (2013.01); B60C 7/10 (2013.01)

(58) Field of Classification Search
CPC ......... B60B 27/065; B60B 11/10; B60B 3/02; B60B 3/008; B60B 3/14; B60B 3/147; B60B 3/16
See application file for complete search history.

(56) References Cited

U.S. PATENT DOCUMENTS

| 2,590,363 | A |  | 3/1952 | Adair |  |
| 3,166,357 | A | * | 1/1965 | Vachon | B60B 3/14 301/9.1 |
| 3,260,294 | A | * | 7/1966 | Campion | B60C 11/18 24/442 |
| 3,649,079 | A | * | 3/1972 | English | B60B 3/14 301/35.631 |
| 3,869,174 | A | * | 3/1975 | Brown | B60B 3/14 301/35.629 |

(Continued)

FOREIGN PATENT DOCUMENTS

| EP | 553696 A2 | 4/1993 |
| WO | 2018071700 A1 | 4/2018 |

OTHER PUBLICATIONS

International Search Report for International Application No. PCT/US2019/036378, dated Sep. 23, 2019.

*Primary Examiner* — Jason R Bellinger
(74) *Attorney, Agent, or Firm* — Thomas Horstemeyer, LLP

(57) ABSTRACT

A universal temporary wheel is provided that has a universal aperture pattern that is adapted to mate with different configurations of lug bolt patterns to enable the wheel to be used with various wheel hub configurations having various lug bolt patterns. The universal temporary wheel can be installed while a damaged wheel is being repaired to allow an automobile or other vehicle to be moved. Because the universal temporary wheel has a universal aperture pattern, the wheel can be used with a variety of wheel hub configurations and lug bolt patterns, thereby eliminating the need to stock a variety of temporary wheels having various aperture patterns.

31 Claims, 16 Drawing Sheets

(56) References Cited

U.S. PATENT DOCUMENTS

| | | | | |
|---|---|---|---|---|
| 5,362,134 | A * | 11/1994 | Carmona | B60B 3/008 301/105.1 |
| 6,626,502 | B1 * | 9/2003 | Petrak | B60B 3/147 301/35.629 |
| 8,281,831 | B2 * | 10/2012 | Lo | B60C 11/0316 152/209.8 |
| 2008/0231107 | A1 | 9/2008 | Ascough | |
| 2012/0091785 | A1 | 4/2012 | Lara, Sr. | |
| 2020/0384803 | A1 * | 12/2020 | Osetek | F16J 15/102 |

* cited by examiner

UNIVERSAL TEMPORARY WHEEL

CROSS-REFERENCE TO RELATED APPLICATION

This application claims the benefit of and priority to U.S. Provisional Patent Application No. 62/684,001 entitled "UNIVERSAL TEMPORARY WHEEL," filed Jun. 12, 2018, the contents of which being incorporated herein by reference in their entirety.

BACKGROUND

The task of repairing a damaged wheel of an automobile or other vehicle typically involves loosening lug nuts, using a jack to raise the vehicle, removing the lug nuts and the damaged wheel, repairing the damaged wheel, and reinstalling the repaired wheel and any other damaged component on the vehicle. During repair, the vehicle typically remains on the jack or on jack stands, rendering the vehicle immobile. If the vehicle is being repaired in a mechanic's shop, this prevents the bay occupied by the vehicle from being used for other purposes. The vehicle is also in danger of falling or being damaged by an improperly placed jack or jack stands. Stocking a variety of temporary wheels that may or may not be compatible with the vehicle's wheel hub is a less-than-ideal solution.

In addition, some types of vehicles periodically undergo sustained periods of nonuse. For example, vehicles that are primarily suited for summer use such as boats and boat trailers might not be used during the winter. While they are not being used, these vehicles may be put into long-term storage, often for months at a time. There is a risk, however, that the vehicle's wheels become damaged during these periods if the wheels are improperly stored.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
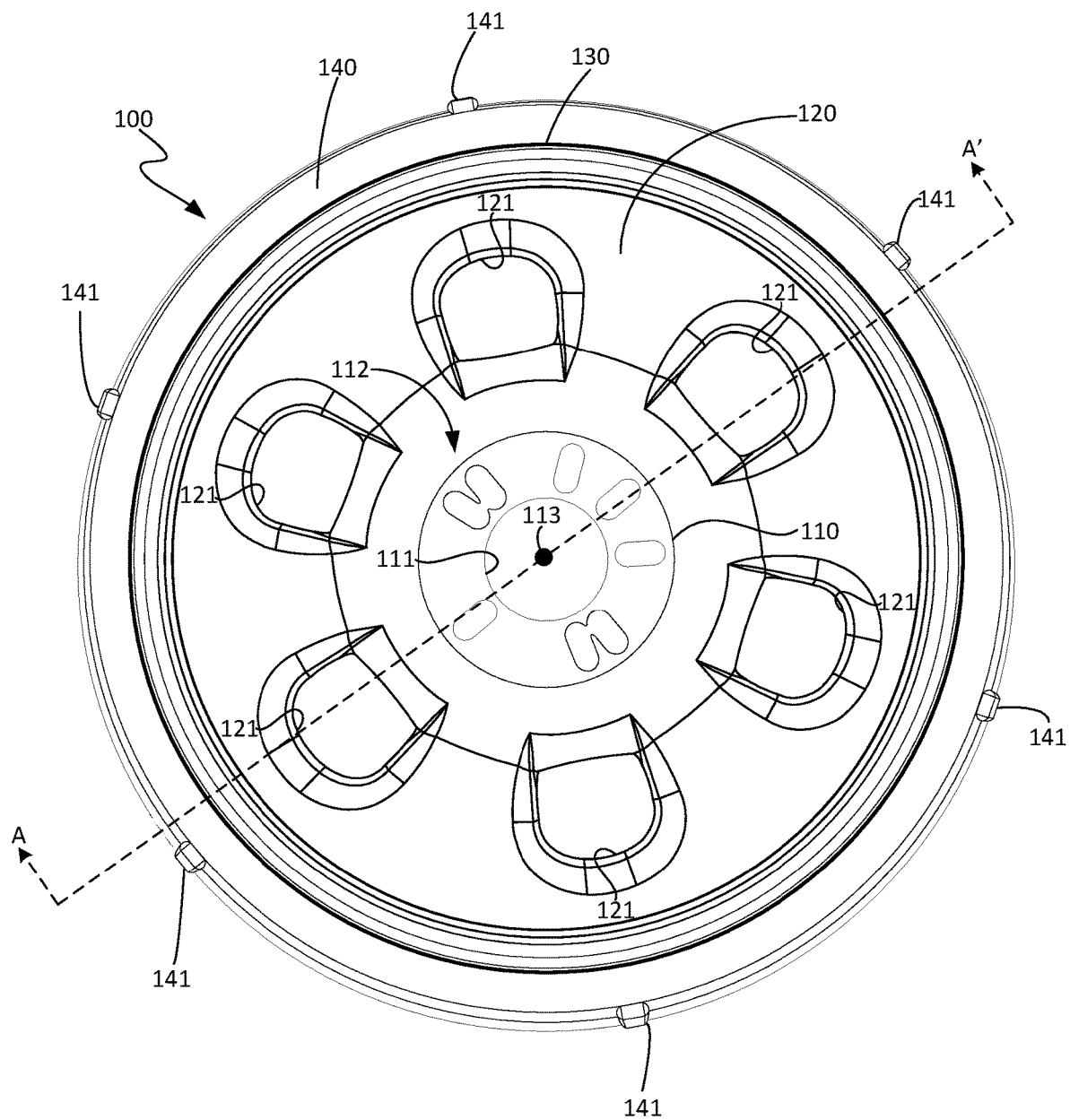
FIG. 1 shows a front perspective view of the universal temporary wheel in accordance with various embodiments of the present disclosure.

The present disclosure relates to a universal temporary wheel. In contrast to the bolt-hole patterns of conventional temporary wheels, the bolt-hole pattern of the universal temporary wheel is compatible with more than one configuration of lug bolts disposed on the respective wheel hub assemblies of automobiles or other vehicles. Thus, the universal temporary wheel can be installed on automobiles or other vehicles having a variety of lug bolt patterns disposed on a variety of respective wheel hub assemblies.

For example, while an automobile wheel is being repaired at a mechanic's shop, the automobile typically remains elevated in the air on a jack or jack stands and occupies a bay in the shop. Because the automobile is rendered immobile while it remains on the jack or jack stands, the bay cannot be used to work on other automobiles throughout the repair process. This can result in reduced revenues for the shop owner.

In addition, while the automobile remains on the jack or jack stands, it is in danger of being damaged. For one, there is a danger that the jack or jack stands become dislodged and cause the automobile to fall, which can result in severe damage to the automobile and injury or even death to any persons impacted by the falling automobile. The jack or jack stands might also be improperly placed under a portion of the automobile that is not designed to support the weight of the automobile. This may cause damage to that portion and other portions of the automobile. Damage from a dislodged or improperly placed jack stand typically results in out-of-pocket payments to repair the damage, increased insurance premiums, or both.

It is therefore desirable to allow an automobile or other vehicle to be moved while its wheel is being repaired. A mechanic may attempt to do so by installing a temporary wheel on the automobile. The temporary wheel, however, must have a bolt-hole pattern that is compatible with the pattern of lug bolts disposed on the wheel hub of the automobile. Thus, the mechanic must stock a multitude of temporary wheels having a variety of lug bolt patterns. These temporary wheels often occupy a large amount of storage space, and the mechanic may still not have a temporary wheel that is compatible with the automobile's wheel hub.

In addition, outside the repair context, wheels may become damaged if improperly stored for sustained periods of time. To illustrate, recreational vehicles that are primarily used during the summer such as boats and boat trailers are often put into storage during the winter months. When the vehicle is retrieved from storage, its wheels may be damaged if the wheels were improperly stored. For example, improper long-term storage may cause dry rotting on a tire's side walls or flat spots on the portions of the tire that were in contact with the ground. As another example, because a boat and its trailer must often be stored outside, boat trailer wheels may be damaged by exposure to winter weather. Thus, it is also desirable to prevent damage to a vehicle's wheels during long periods of storage or nonuse.

According to various embodiments described herein, a universal temporary wheel may have a universal aperture pattern that is adapted to receive different configurations of bolt patterns disposed on the wheel hubs of various axle assemblies. This enables the universal temporary wheel to be used with a variety of wheel hub configurations and lug bolt patterns. Thus, the universal temporary wheel can be installed on a vehicle while it is being repaired or when the vehicle is being stored.

Because the universal temporary wheel can be installed while an automobile's damaged wheel is being repaired, the automobile can be moved during repair the process, despite having a damaged wheel. If the automobile is being repaired in a mechanic's shop, the automobile may then be moved out of the bay that it occupied so that the bay may be used to work on other automobiles. Doing so may also enable the jack or jack stands being used to support the automobile to be used for other tasks. Thus, allowing the automobile to be mobile during the repair process can increase overall repair efficiency, cut wait times, and lead to increased revenue.

Installing the universal temporary wheel can also prevent damage that may result from the automobile remaining on a jack or jack stands. Because the automobile need not be on a jack once the universal temporary wheel has been installed until the repair is complete, the automobile is far less likely to fall because of a dislodged jack or jack stand, decreasing the risk of damage to the automobile, as well as the risk of bodily injury to persons impacted by the falling automobile. And, because the automobile only remains on the jack for a short amount of time, the risk of damage from an improperly placed jack or jack stand is also reduced.

The universal temporary wheel likewise eliminates the need to stock a variety of temporary wheels having various aperture patterns. Instead, a mechanic can stock the universal temporary wheel, which can be used with a variety of wheel hubs having a variety of lug bolt patterns. This eliminates possibility of not possessing a temporary wheel that matches a particular wheel hub.

Further, the universal temporary wheel prevents damage to a vehicle's permanent wheels while the vehicle is in storage. For instance, during storage, a vehicle's permanent wheels can be replaced by one or more universal temporary wheels. This allows the permanent wheels to be properly stored, preventing damage from, for example, dry rot, flat spots, and weather exposure.

Figure 2A:
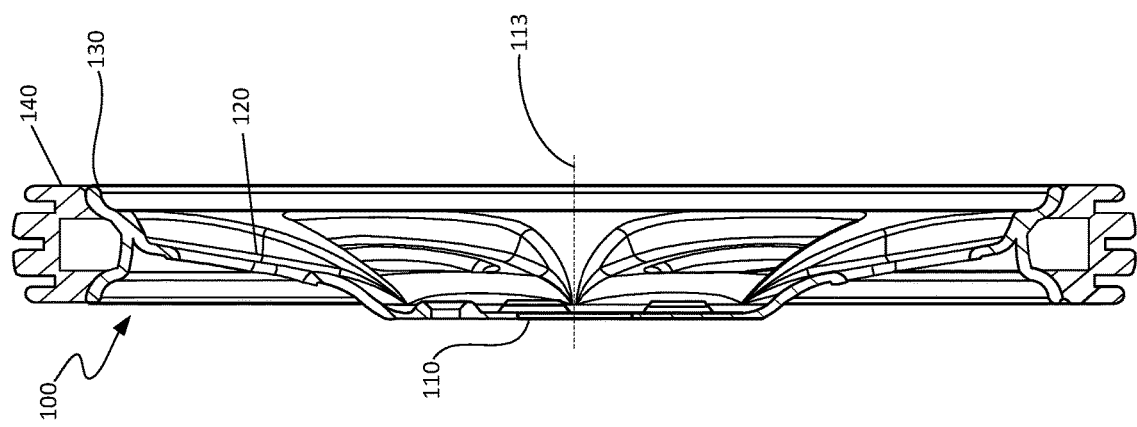
FIGS. 2A-2B show side cross-sectional views of the universal temporary wheel of FIG. 1 taken along line A-A' in accordance with various embodiments of the present disclosure.
Figure 2B:
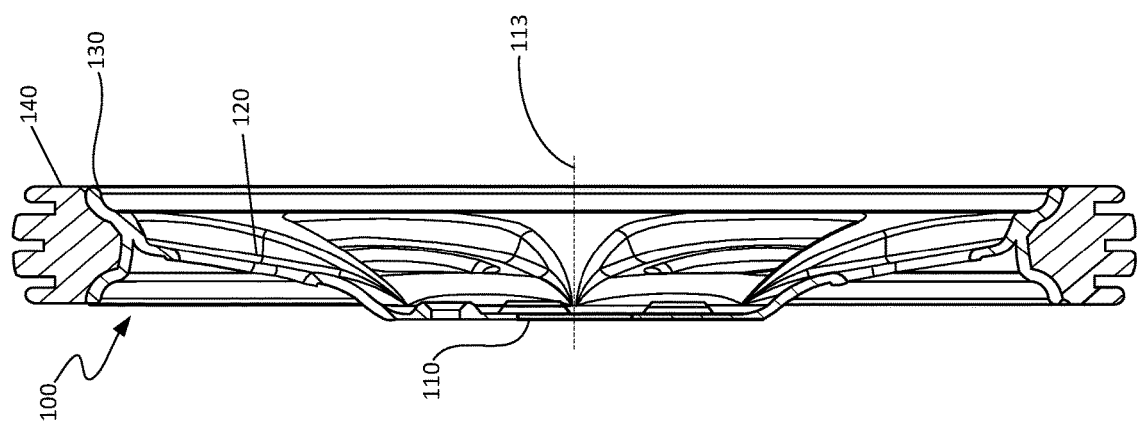

With reference to FIG. 1, shown is a front perspective view of the universal temporary wheel 100 in accordance with various embodiments of the present disclosure. FIGS. 2A-2B show side cross-sectional views taken along line A-A' of the universal temporary wheel shown in FIG. 1. The universal temporary wheel 100 can have a wheel hub mounting plate 110, a wheel disc 120, a rim 130 disposed around an outer perimeter of the wheel disc 120, and an outer casing 140 disposed around an outer perimeter the rim. The universal temporary wheel 100 can also have a center 113 located at a center point of the universal temporary wheel 100. When the wheel hub mounting plate 110 is mated with a wheel hub, the center 113 of the universal temporary 100 is located at the same point as the center of the wheel hub.

The wheel hub mounting plate 110 has a central bore 111 adapted to receive an axle (not shown) of an automobile, a recreational vehicle (RV), a tractor, a trailer, or other wheeled apparatus. The wheel hub mounting plate 110 can have a preselected pattern of apertures 112 adapted to receive a plurality of different lug bolt patterns of a plurality of respective wheel hubs coupled to the ends of axles. The pattern of apertures 112 can comprise any number of apertures having various shapes, sizes, and arrangements that allow the wheel hub mounting plate 110 mate with wheel hubs having various lug bolt patterns. It should be appreciated, however, that the pattern of apertures 112 shown in FIG. 1 is merely an example. Other patterns of apertures 112 can be used to allow the wheel hub mounting plate 110 to mate with wheel hubs having a variety of other lug bolt patterns.

The universal temporary wheel 100 can have a plurality of openings 121 formed on the wheel disc 120. The plurality of openings 121 provide the universal temporary wheel 100 with greater structural integrity. In some embodiments, however, the wheel disc 120 may not have the plurality of openings 121. Thus, it should be noted that the wheel disc 120 is not limited the features shown in FIGS. 1 and 2A-2B and can comprise other features not shown in FIGS. 1 and 2A-2B.

The rim 130 is disposed around an outer perimeter of the wheel disc 120. Likewise, the outer casing 140 is disposed around an outer perimeter of the rim 130. The rim 130 is a circular lip around which an inner edge of the outer casing 140 is affixed. The outer casing 140 can comprise any casing designed to provide an interface between the rim 130 and hard surfaces that the universal temporary wheel may contact.

For example, the outer casing 140 can be any ring-shaped component that is designed to fit around the rim 130, such as a tire. The outer casing 140 may, for example, be a pneumatic tire that can retain compressed air within the outer casing 140. In some embodiments, the outer casing 140 can surround an inner tube that can be filled with compressed air. In other embodiments, however, the outer casing 140 can be a tubeless pneumatic tire that instead retains the compressed air within a cavity formed by an inside of the outer casing 140 and the rim 130. In the alternative, the outer casing 140 can be a non-pneumatic tire that does not retain air. In particular, the outer casing 140 can have a solid construction such that there is not a cavity within the outer casting 140 that could retain air. The outer casing 140 may, for example, be made from solid rubber.

A plurality of ribs 141 can be formed on an outer surface of the outer casing 140. As the universal temporary wheel 100 rolls, the ribs 141 can come into contact with a hard surface, such as a road. If the universal temporary wheel 100 is installed on an automobile or other vehicle, the ribs 141 can cause the universal temporary wheel 100 to produce a distinctive sound when the ribs 141 come into rolling contact with the hard surface. The sound can alert a driver of the automobile or other vehicle that the universal temporary wheel 100 is installed on the automobile or other vehicle, as opposed to a permanent wheel. In this way, the driver is made aware that the universal temporary wheel 100 is only intended to be used temporarily until a permanent replacement wheel is available.

With reference to FIGS. 3A-3D, shown are front plan views of the wheel hub mounting plate 110 in accordance with a representative embodiment of the present disclosure. In some embodiments, the wheel hub mounting plate 110 can have an outer diameter equal to approximately 160 millimeters (mm) and the central bore 111 can have a diameter less than approximately 86 mm. Of course, these dimensions are dependent on the dimensions of the wheel hub with which the wheel hub mounting plate 110 is intended to mate. The universal temporary wheel 100 is therefore not limited to having these dimensions or any particular dimensions.

In FIGS. 3A-3D, the wheel hub mounting plate 110 includes a pattern of apertures 112 comprising a total of six apertures 310-315. The pattern of apertures 112 is adapted to receive the lug bolts of wheel hubs having four- or five-lug-bolt patterns. Due to the elongated shapes of the apertures 310-315, the wheel hub mounting plate 110 can mate with four- or five-lug-bolt patterns having lug bolts that are positioned at several different distances from the center 113 of the wheel hub mounting plate 110, as discussed in detail below. It should be appreciated, however, that FIGS. 3A-4B merely demonstrate an example of a wheel hub mounting plate 110 that can be configured to accommodate a variety different lug bolt patterns.

Apertures 311, 312, 313, and 315 can have a same shape that is different from the shape of apertures 310 and 314. For example, apertures 311, 312, 313, and 315 can be elongated openings, or slots, of a substantially discorectangular shape. Apertures 310 and 314 can likewise have a same shape that is different from the shape of apertures 311, 312, 313, and 315. For example, apertures 310 and 314 can have a shape that is similar to two side-by-side elongated slots of substantially discorectangular shape like apertures 311, 312, 313, and 315 oriented at an acute angle relative to each other that are connected together by a slot that extends laterally between them.

Figure 3A:
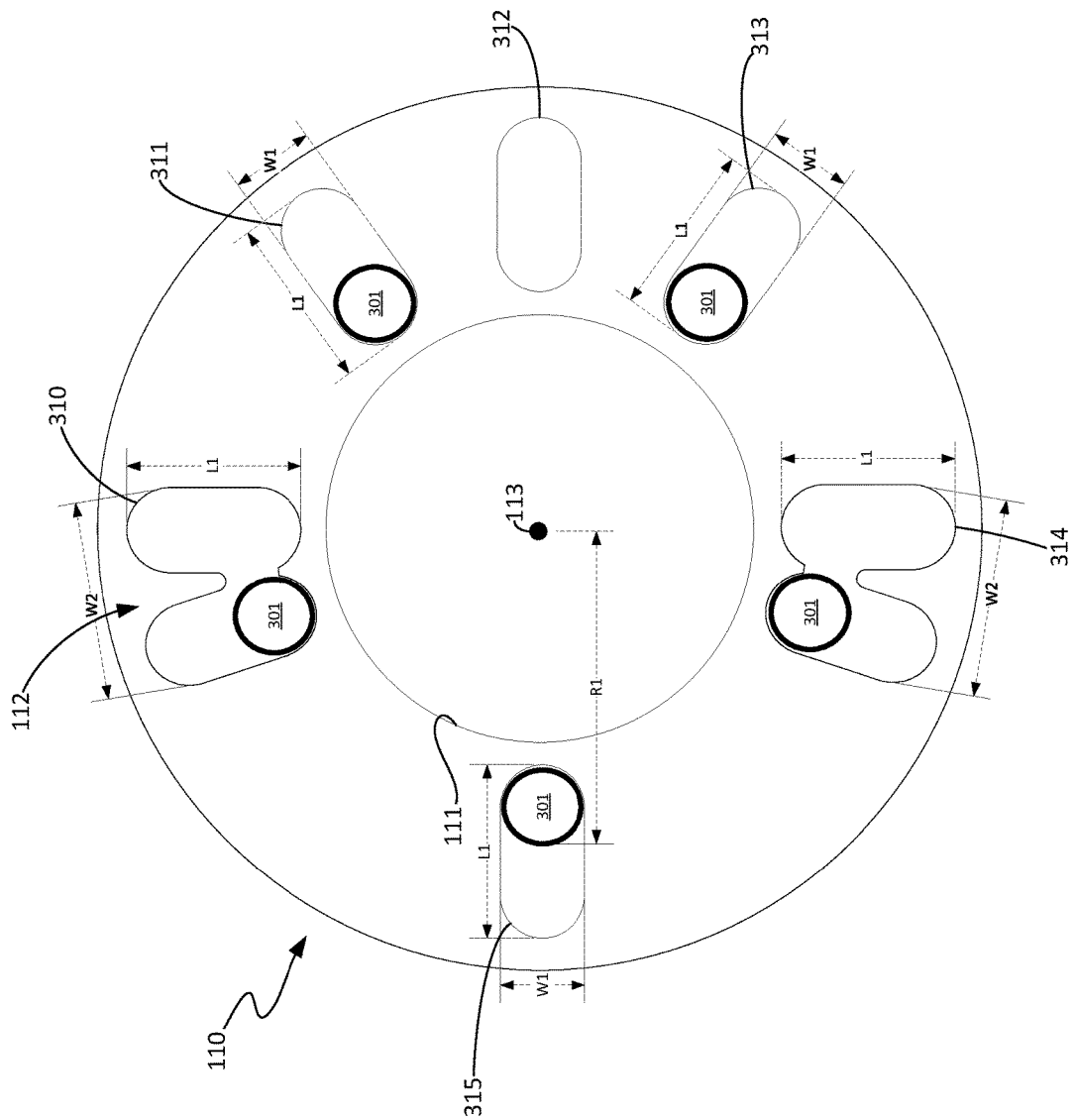
FIGS. 3A-3D show front plan views of the wheel hub mounting plate mated with wheel hubs having four and five lug bolts in accordance with various embodiments of the present disclosure in which the wheel hub mounting plate is adapted to mate with wheel hubs having four or five lug bolts.
Figure 3B:
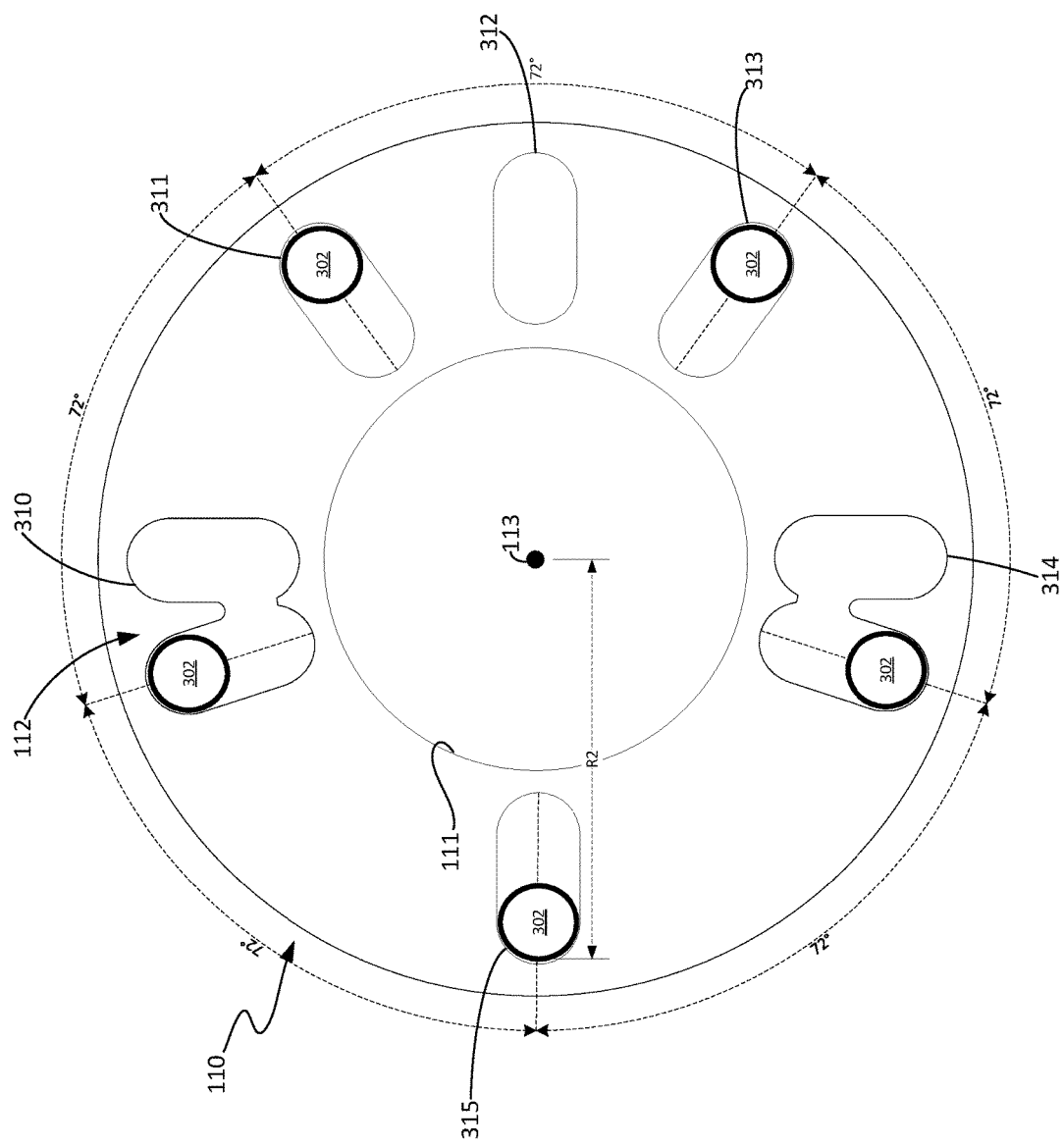

Turning to FIGS. 3A and 3B in particular, shown are examples of the wheel hub mounting plate 110 in which apertures 310, 311, 313, 314, and 315 are each mated with a lug bolt 301 or 302 of a respective five-lug-bolt pattern of a five-lug-bolt wheel hub. While FIGS. 3A and 3B provide examples of five-lug-bolt patterns with which the wheel hub mounting plate 110 can mate, the wheel hub mounting plate 110 is adapted to mate with various other five-lug-bolt patterns as well.

Apertures 310, 311, and 313-315 are adapted to receive lug bolts 301 or 302 that are positioned at a plurality of radial distances from the center 113 of the universal temporary wheel 100. FIG. 3A the shows wheel hub mounting plate 110 mated with a first five-bolt lug pattern comprising a plurality of lug bolts 301 that are positioned at a first radial distance, R1, from center 113. FIG. 3B shows the wheel hub mounting plate 110 mated with a second five-lug-bolt pattern having a plurality of lug bolts 302 that are positioned at a second radial distance, R2, from center 113 that is greater than the first radial distance R1. It should be appreciated, however, that the wheel hub mounting plate 110 is also adapted to mate with lug bolt patterns having lug bolts positioned at various other distances from the center 113 of the universal temporary wheel 100.

FIG. 3A also shows the length and width of apertures 310, 311, 313, 314, and 315. Apertures 311, 312, 313, and 315 can have a first width, W1, which can be equal to, or substantially equal to, the diameter of the lug bolts 301 or 302, or the lug bolts found on various other wheel hubs. Apertures 310, 311, 313, and 314 can have a first length, L1, which is greater than the first width W1. Apertures 310 and 314 can have a second width, W2, which can be equal to approximately twice the first width W1. In some embodiments, the first width W1 can be equal to approximately 15.5 mm and the first length L1 can be equal to approximately 32 mm. Apertures 310, 311, 313, 314, and 315 are not, however, limited to having these dimensions or any particular dimensions.

FIG. 3B also shows the angular distance between apertures 310, 311, 313, 314, and 315. In particular, the angular distance between any two adjacent apertures 310, 311, 313, 314, and 315 can be equal to approximately 72°.

Figure 3C:
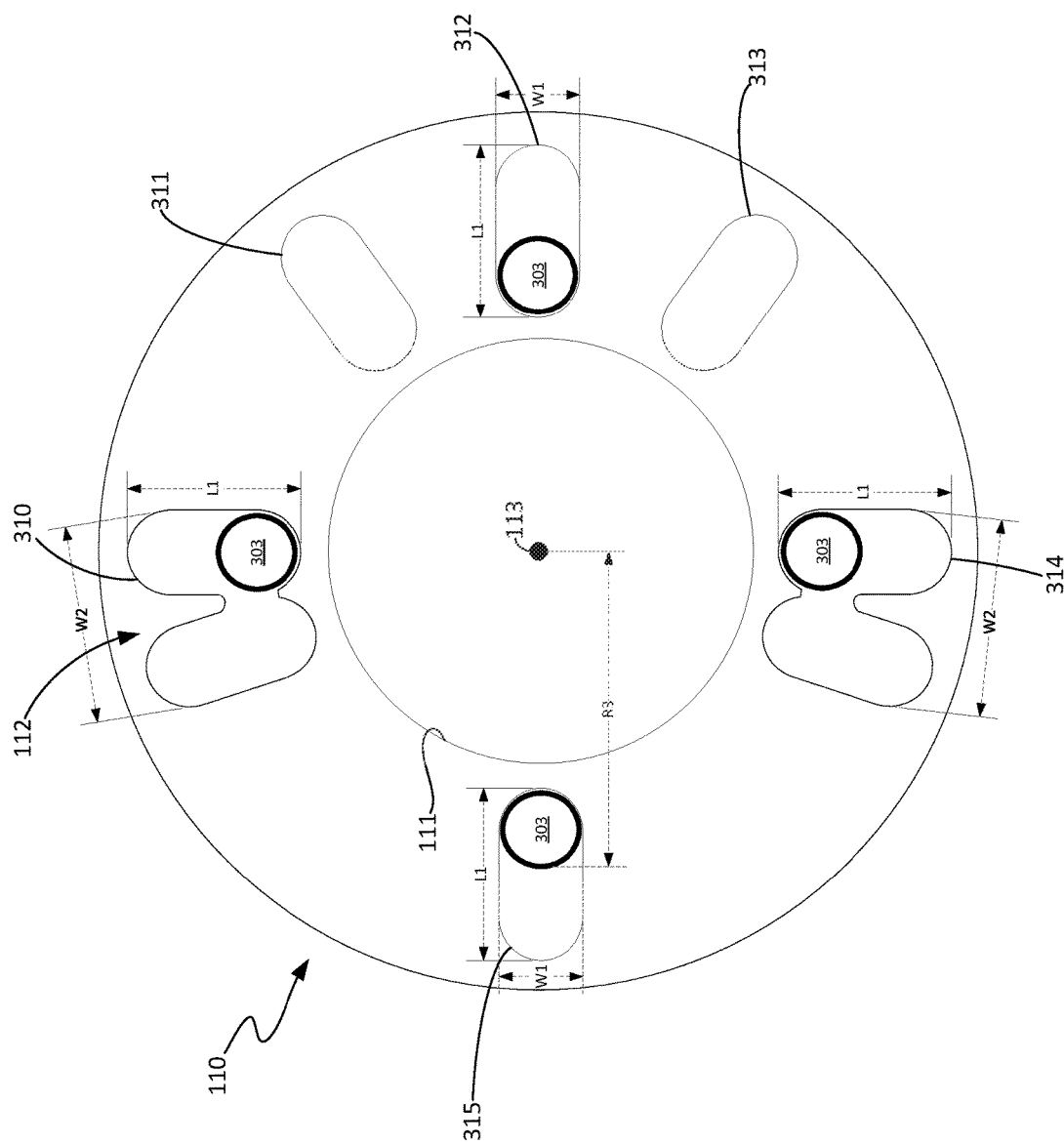
Figure 3D:
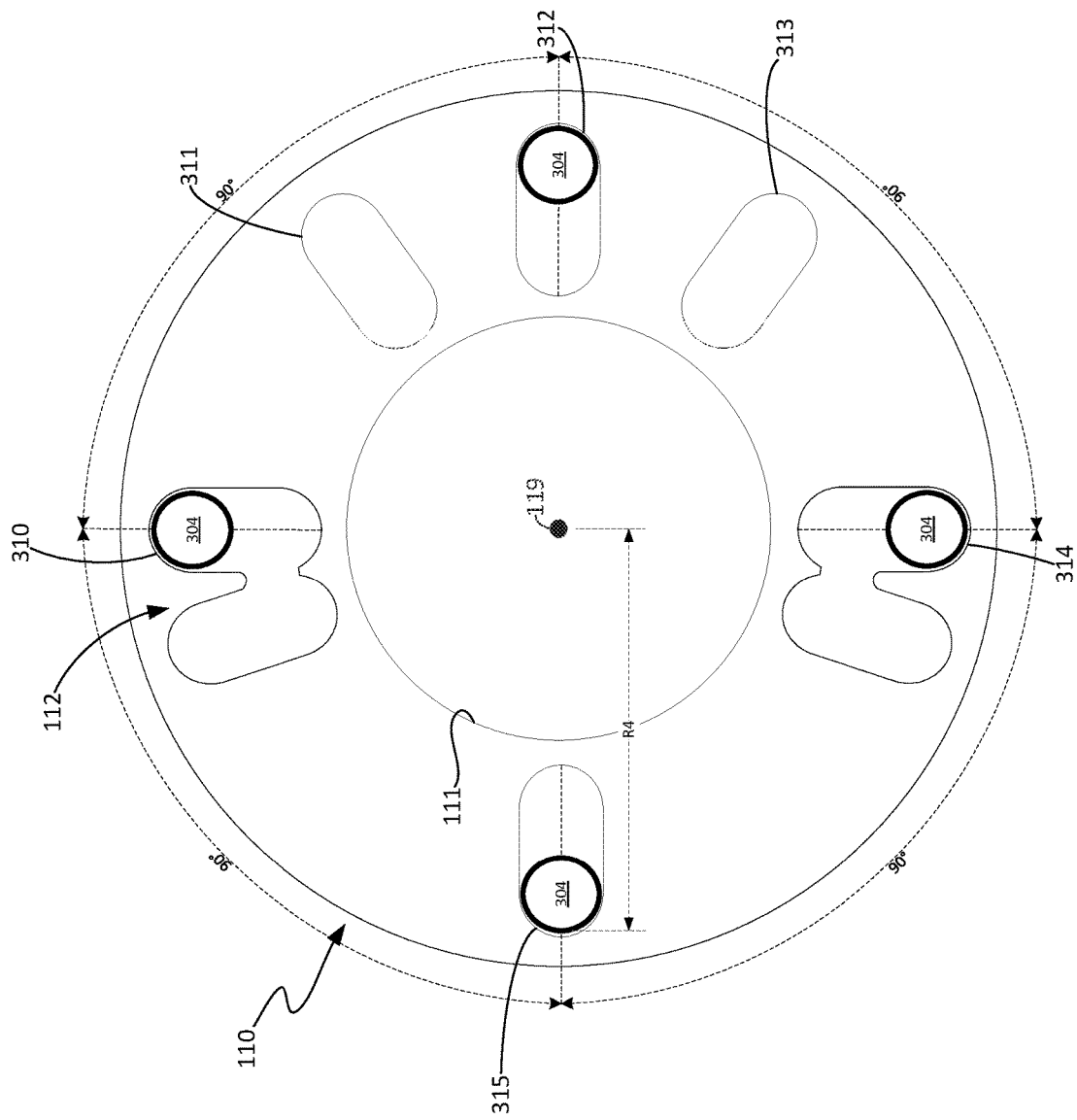

Turning next to FIGS. 3C and 3D, shown are examples of the wheel hub mounting plate 110 in which apertures 310, 312, 314, and 315 are each mated with a lug bolt 303 or 304 of a respective four-lug-bolt pattern of a four-lug-bolt wheel hub. While FIGS. 3C and 3D provide examples of four-lug-bolt patterns with which the wheel hub mounting plate 110 can mate, the wheel hub mounting plate 110 is adapted to mate with various other four-lug-bolt patterns as well.

Apertures 310, 312, 314, and 315 are adapted to receive lug bolts that are positioned at various distances from the center 113 of the universal temporary wheel 100. FIG. 3C shows the wheel hub mounting plate 110 mated with a first five-bolt lug pattern comprising a plurality of lug bolts 303 that are positioned at a third radial distance, R3, from center 113. FIG. 3D shows the wheel hub mounting plate 110 mated with a second five-lug-bolt pattern having a plurality of lug bolts 304 that are positioned at a fourth radial distance, R4, from center 113 that is greater than the third radial distance R3. It should be appreciated, however, that the wheel hub mounting plate 110 is also adapted to mate with lug bolt patterns having lug bolts positioned at various other distances from the center 113 of the universal temporary wheel 100.

FIG. 3C also shows the length and width of apertures 310, 312, 314, and 315. Apertures 310, 312, 314, and 315 can have a first width, W1, which can be equal to, or substantially equal to, the diameter of the lug bolts 303 or 304, or the lug bolts found on various other wheel hubs. Apertures 310, 312, 314, and 315 can have a first length, L1, which is greater than the width W1. Apertures 310 and 314 may have a second width, W2, which is substantially equal to twice the first width W1. It should be noted that the first length L1, first width W1, and second width W2 shown in FIG. 3C can each be equal to the first length L1, first width W1, and second width W2 shown in FIG. 3A, respectively. In some embodiments, the first width W1 can be equal to approximately 15.5 mm and the first length L1 can be equal to approximately 32 mm. Apertures 310, 312, 314, and 315 are not, however, limited to having these dimensions or any particular dimensions.

FIG. 3D also shows the angular distance between apertures 310, 312, 314, and 315. In particular, the angular distance between any two adjacent apertures 310, 312, 314, and 315 can be equal to approximately 90°.

Thus, embodiments of the wheel hub mounting plate 110 shown in FIGS. 3A-3D are adapted to mate with different four-lug-bolt patterns and with different five-lug-bolt patterns. It should be noted, however, that the inventive principles and concepts therein are not limited with respect to the number of lug bolts that can be accommodated or with respect to the number of lug bolt patterns that can be accommodated.

With reference to FIGS. 4A-4D, shown are front plan views of the wheel hub mounting plate 110 in accordance with another representative embodiment of the present disclosure. In some embodiments, the wheel hub mounting plate 110 can have a diameter equal to approximately 174.17 mm. and the central bore 111 can have a diameter equal to approximately 110.7 mm. Of course, these dimensions are dependent on the dimensions of the wheel hub with which the wheel hub mounting plate 110 is intended to mate. The universal temporary wheel 100 is therefore not limited to having these dimensions or any particular dimensions.

In FIGS. 4A-4D, the wheel hub mounting plate 110 includes a pattern of apertures 112 comprising a total of eight apertures 410-417. The pattern of apertures 112 is adapted to receive the lug bolts of wheel hubs having five- or six-lug-bolt patterns. It should be appreciated, however, that FIGS. 4A-4D merely demonstrate an example of a wheel hub mounting plate 110 that can be configured to accommodate a variety different lug bolt patterns.

Apertures 410, 412, 414, and 416 can have a same shape that is different from the shape of apertures 411, 413, 415, and 417. For example, apertures 410, 412, 414, and 416 can be slots of a substantially circular shape similar to a shape of the lug bolts 401 or 402. Apertures 411 and 417 can likewise have a same shape that is different from the shape of apertures 410, 412, 414, and 416 and of apertures 413 and 415. For example, apertures 411 and 417 can be slots of a substantially discorectangular shape. Similarly, apertures 413 and 415 can have a same shape that is different from the shape of apertures 410, 412, 414, and 416 and of apertures 411 and 417. For example, apertures 413 and 415 can be elongated slots of a substantially discorectangular shape that is longer than the discorectangular shape of apertures 411 and 417.

Figure 4A:
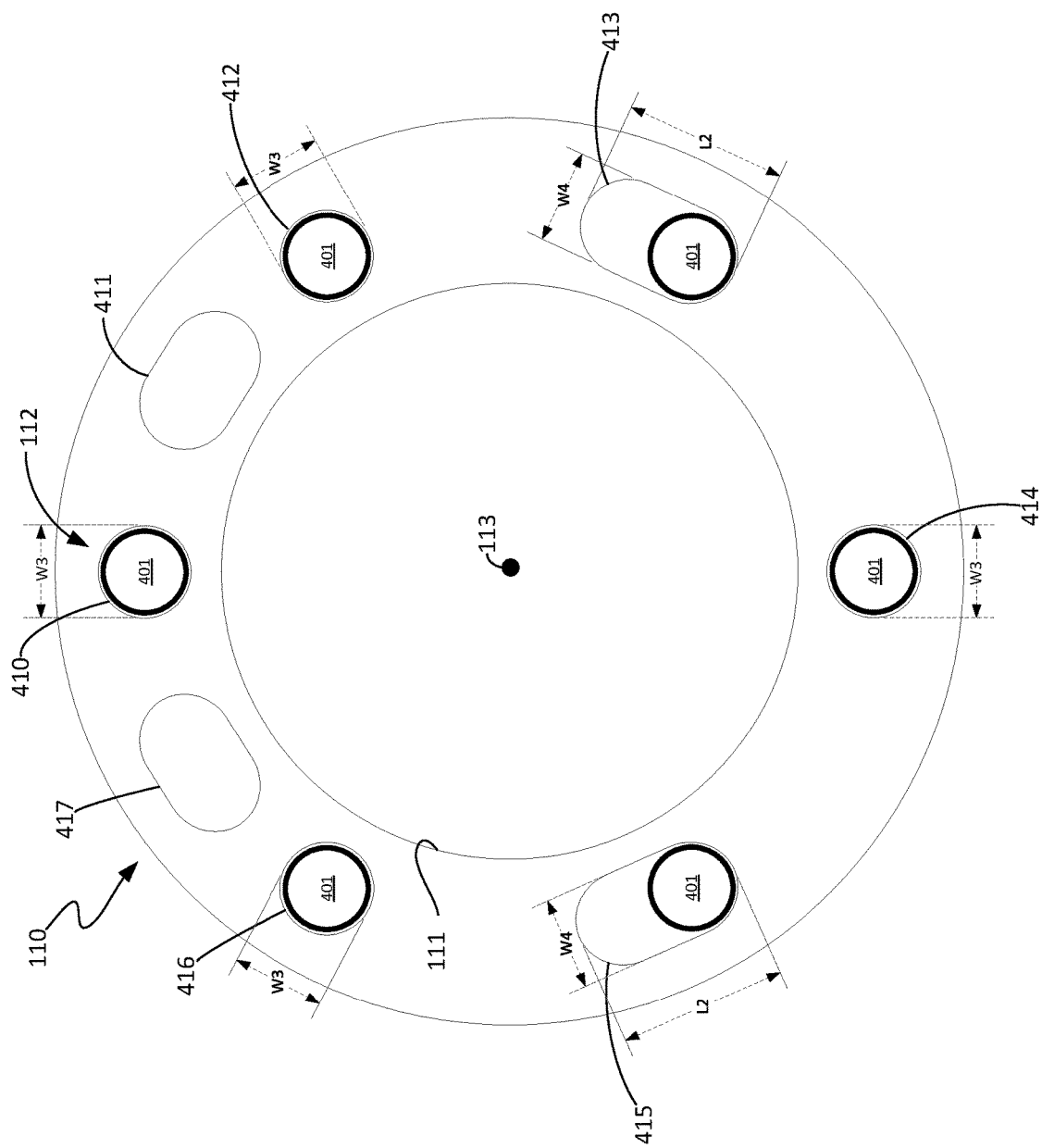
FIGS. 4A-4D show front plan views of the wheel hub mounting plate mated with wheel hubs having five and six lug bolts in accordance with various embodiments of the present disclosure in which the wheel hub mounting plate is adapted to mate with wheel hubs having five or six lug bolts.
Figure 4B:
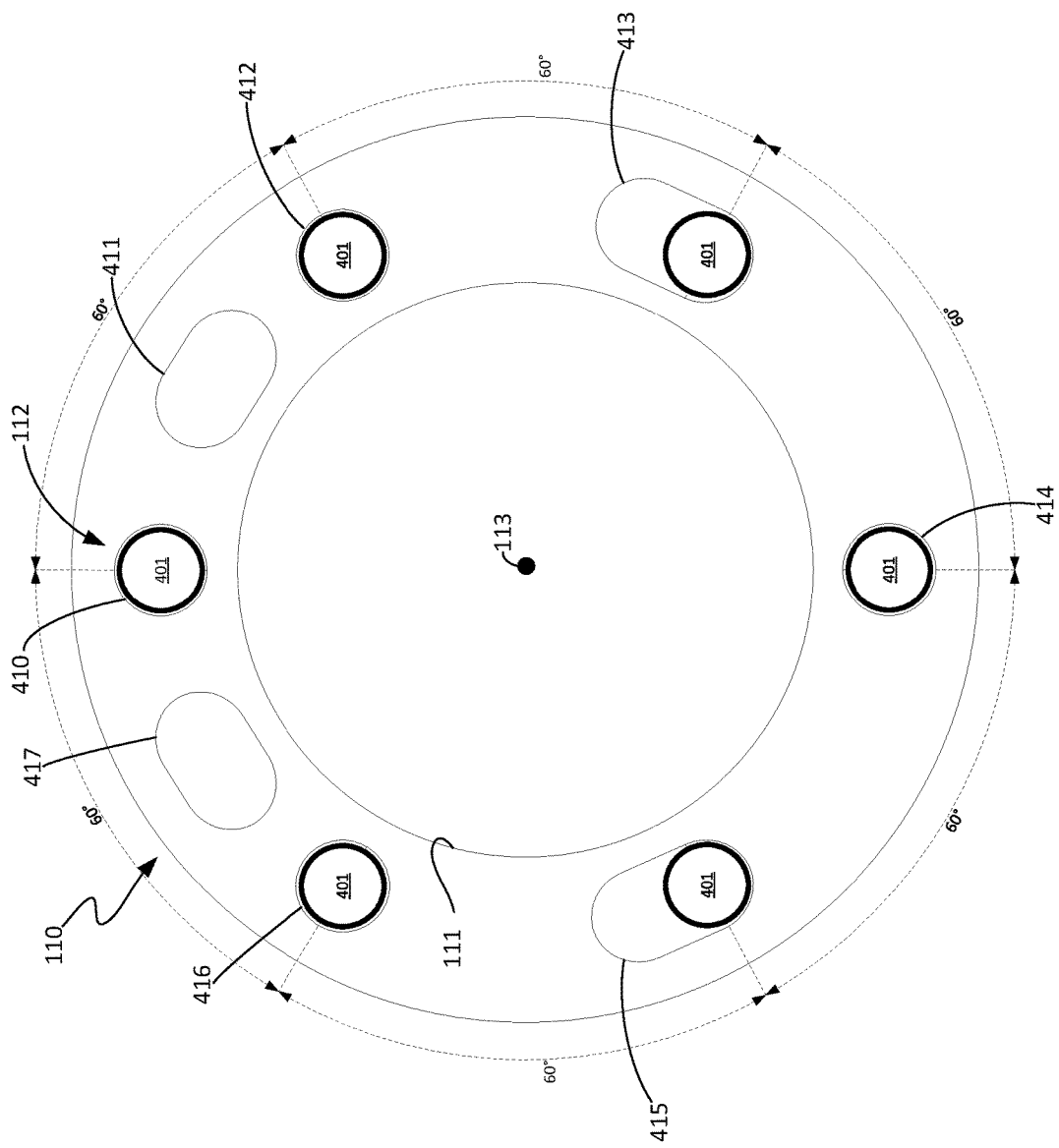

Turning to FIGS. 4A AND 4B in particular, provided are examples of the wheel hub mounting plate 110 in which apertures 410, 412, 413, 414, 415, and 416 are each mated with a lug bolt 401 of a six-lug-bolt pattern of a six-lug-bolt wheel hub. While FIGS. 4A and 4B provide an example of a six-lug-bolt pattern with which the wheel hub mounting plate 110 can mate, the wheel hub mounting plate 110 is adapted to mate with various other five- or six-lug-bolt patterns as well.

FIG. 4A also shows the length and width of apertures 410, 412, 413, 414, 415, and 416. Apertures 410, 412, 414, and 416 can have a third width, W3, which can be equal to, or substantially equal to, the lug bolts 401, or the lug bolts found on various other wheel hubs. Apertures 413 and 415 can have a fourth width W4 that is greater than the third width W3. Apertures 413 and 415 can have a second length, L2, which is greater than both the third width W3 and the fourth width W4.

FIG. 4B also shows the angular distance between apertures 410, 412, 413, 414, 415, and 416. In particular, the angular distance between any two adjacent apertures 410, 412, 413, 414, 415, and 416 can be equal to approximately 60°.

Figure 4C:
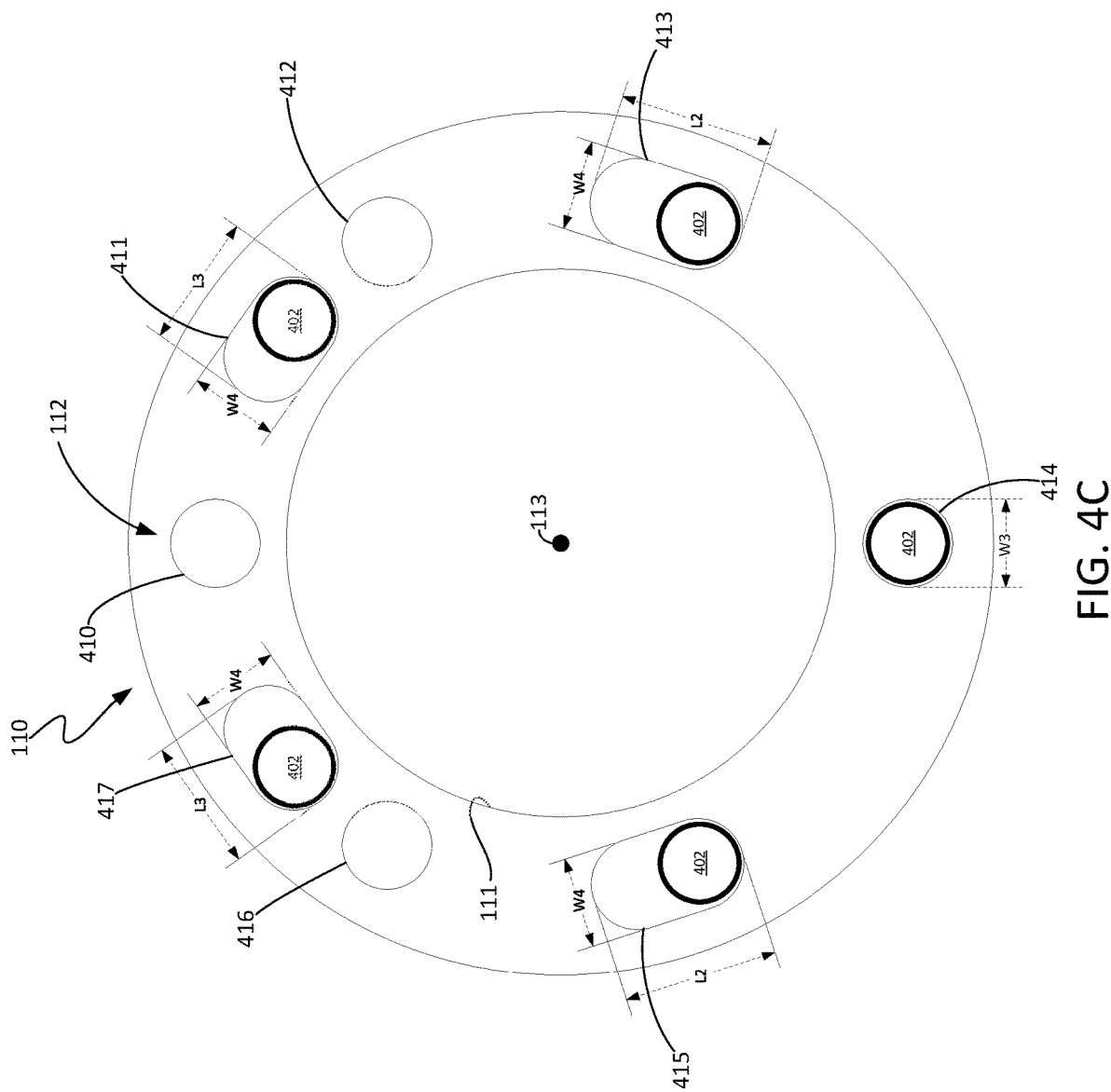
Figure 4D:
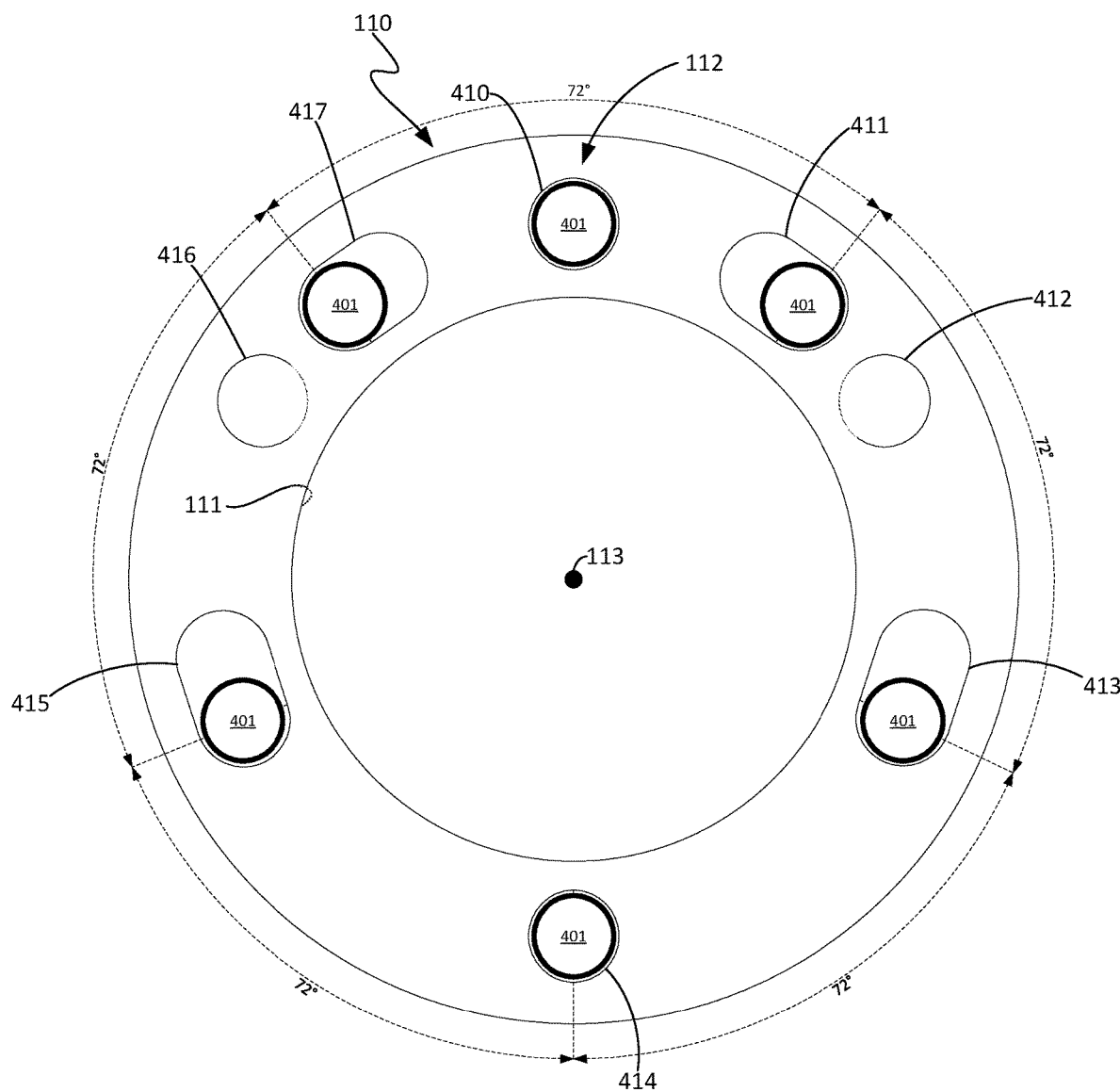

Turning to FIGS. 4C and 4D in particular, provided are examples of the wheel hub mounting plate 110 in which apertures 411, 413, 414, 415, 417 are each mated with a lug bolt 402 of a five-lug-bolt wheel hub. While FIGS. 4C and 4D provide an example of a five-lug-bolt pattern with which the wheel hub mounting plate 110 can mate, the wheel hub mounting plate 100 is adapted to mate with various other five- or six-lug-bolt patterns as well.

FIG. 4C also shows the length and width of apertures 411, 413, 414, 415, and 417. Apertures 411, 413, 414, 415, and 417 can have a third width, W3, which can be equal to, or substantially equal to, the diameter of the lug bolts 402, or the lug bolts found on various other wheel hubs. Apertures 413 and 415 can have a second length, L2, which is greater than the third width W3. Apertures 411 and 417 can have a third length, L3, which is greater than the third width W3 but less than the second length L2. It should be noted that the second length L2 and the third width W3 shown in FIG. 4C can each be equal to the second length L2 and third width W3 shown in FIG. 4A, respectively. In some embodiments, W3 can be equal to approximately 17 mm and W4 can be equal to approximately 18.54 mm. Apertures 411, 413, 414, 415, and 417 are not, however, limited to having these dimensions or any particular dimensions.

FIG. 4D also shows the angular distance between apertures 411, 413, 414, 415, and 417. In particular, the angular distance between any two apertures 411, 413, 414, 415, and 417 can be equal to approximately 72°.

Thus, embodiments of the wheel hub mounting plate shown in FIGS. 4A-4D are adapted to mate with different five-lug-bolt patterns and with different six-lug-bolt patterns. It should be noted, however, that the inventive principles and concepts therein are not limited with respect to the number of lug bolts that can be accommodated or with respect to the number of lug bolt patterns that can be accommodated.

With reference to FIGS. 5A-5F, shown are front plan views of the wheel hub mounting plate 110 in accordance with another representative embodiment of the present disclosure. In some embodiments, the wheel hub mounting plate 110 can have a diameter equal to approximately 174.17 mm. and the central bore 111 can have a diameter equal to approximately 110.7 mm. Of course, these dimensions are dependent on the dimensions of the wheel hub with which the wheel hub mounting plate 110 is intended to mate. The universal temporary wheel 100 is therefore not limited to having these dimensions or any particular dimensions.

In FIGS. 5A-5F, the wheel hub mounting plate 110 includes a pattern of apertures 112 comprising a total of thirteen apertures 510-522. The pattern of apertures 112 is adapted to receive the lug bolts of wheel hubs having five- or six-lug-bolt patterns. It should be appreciated, however, that FIGS. 5A-5F merely demonstrate an example of a wheel hub mounting plate 110 that can be configured to accommodate a variety different lug bolt patterns.

Apertures 510, 512, 513, 515, 516, 517, 519, 520, and 522 can have a same shape that is different from the shape of apertures 511, 514, 518, and 521. For example, apertures 510, 512, 513, 515, 516, 517, 519, 520, and 522 can be slots of a substantially circular shape similar to a shape of the lug bolts 501, 502, or 503. Apertures 511 and 521 can likewise have a same shape that is different from the shape of apertures 510, 512, 513, 515, 516, 517, 519, 520, and 522 and of apertures 514 and 518. For example, apertures 511 and 521 can be slots of a substantially discorectangular shape. Similarly, aperture 518 may have a shape different from the shape of apertures 510, 512, 513, 515, 516, 517, 519, 520, and 522, of apertures 511 and 521, and of aperture 514. For example, aperture 514 can be an elongated slot of a substantially discorectangular shape that is longer than the discorectangular shape of apertures 511 and 521. Further, aperture 514 may have a shape different from the shape of apertures 510, 512, 513, 515, 516, 517, 519, 520, and 522, and of apertures 511 and 521, and of aperture 518. For example, aperture 514 can have a shape that is similar to two elongated slots of substantially discorectangular shape that meet each other at a right angle to form a "V"-like shape.

Figure 5A:
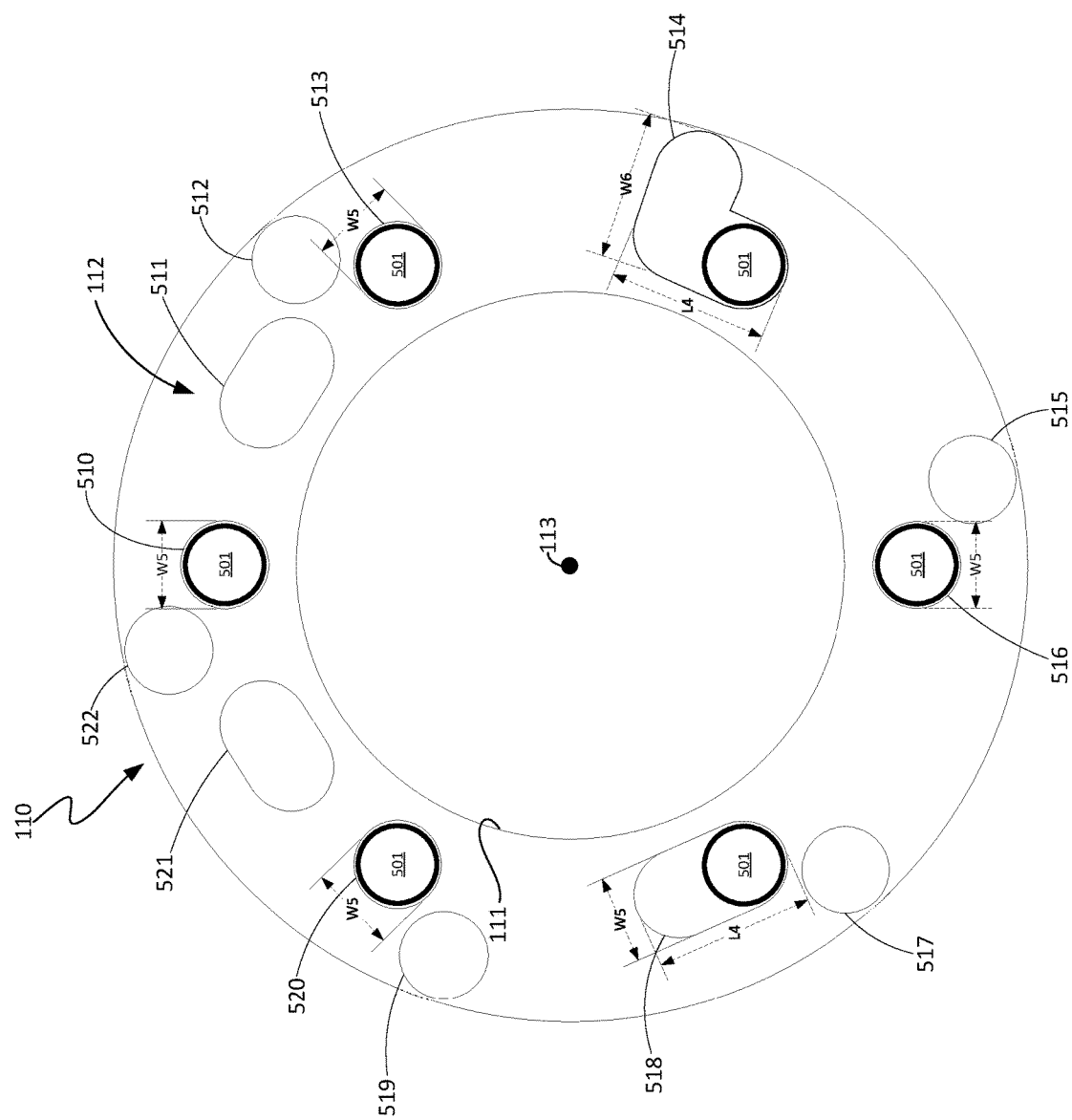
FIGS. 5A-5F show front plan views of the wheel hub mounting plate mated with wheel hubs having five and six lug bolts in accordance with various embodiments of the present disclosure in which the wheel hub mounting plate is adapted to mate with wheel hubs having five or six lug bolts.
Figure 5B:
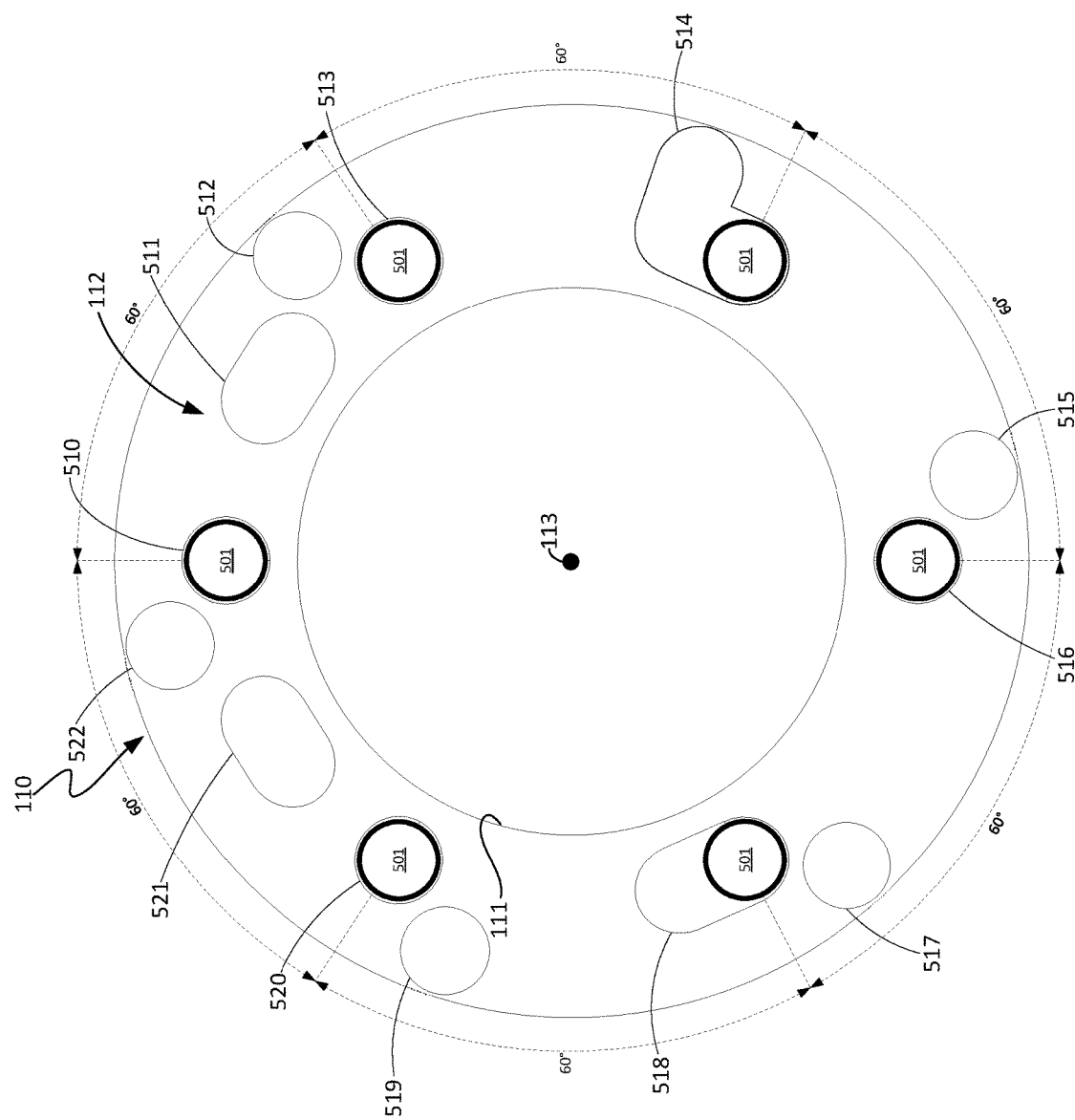

Turning to FIGS. 5A and 5B in particular, shown are examples of the wheel hub mounting plate 110 in which apertures 510, 513, 514, 516, 518, and 520 are each mated with a lug bolt 501 of a six-lug-bolt pattern of a six-lug-bolt wheel hub. While FIGS. 5A and 5B provide an example of a six-lug-bolt pattern with which the wheel hub mounting plate 110 can mate, the wheel hub mounting plate 110 is adapted to mate with various other five- and six-lug-bolt patterns as well.

FIG. 5A also shows the length and width of apertures 510, 513, 514, 516, 518, and 520. Apertures 510, 513, 516, 518, and 520 can have a fifth width, W5, which can be equal to, or substantially equal to, the diameter of the lug bolts 501, or the lug bolts found on various other wheel hubs. Aperture 514 can have a sixth length, W6, which is greater than the fifth width W5. Apertures 514 and 518 can have a fourth length, L4, which is greater than the fifth width W5 and the sixth width W6. In some embodiments, W5 can be equal to approximately 17 mm. Apertures 510, 513, 514, 516, 518, and 520 are not, however, limited to having these dimensions or any particular dimensions.

FIG. 5B also shows the angular distance between apertures 510, 513, 514, 516, 518, and 520. In particular, the angular distance between any two adjacent apertures 510, 513, 514, 516, 518, and 520 can be equal to approximately 60°.

Figure 5C:
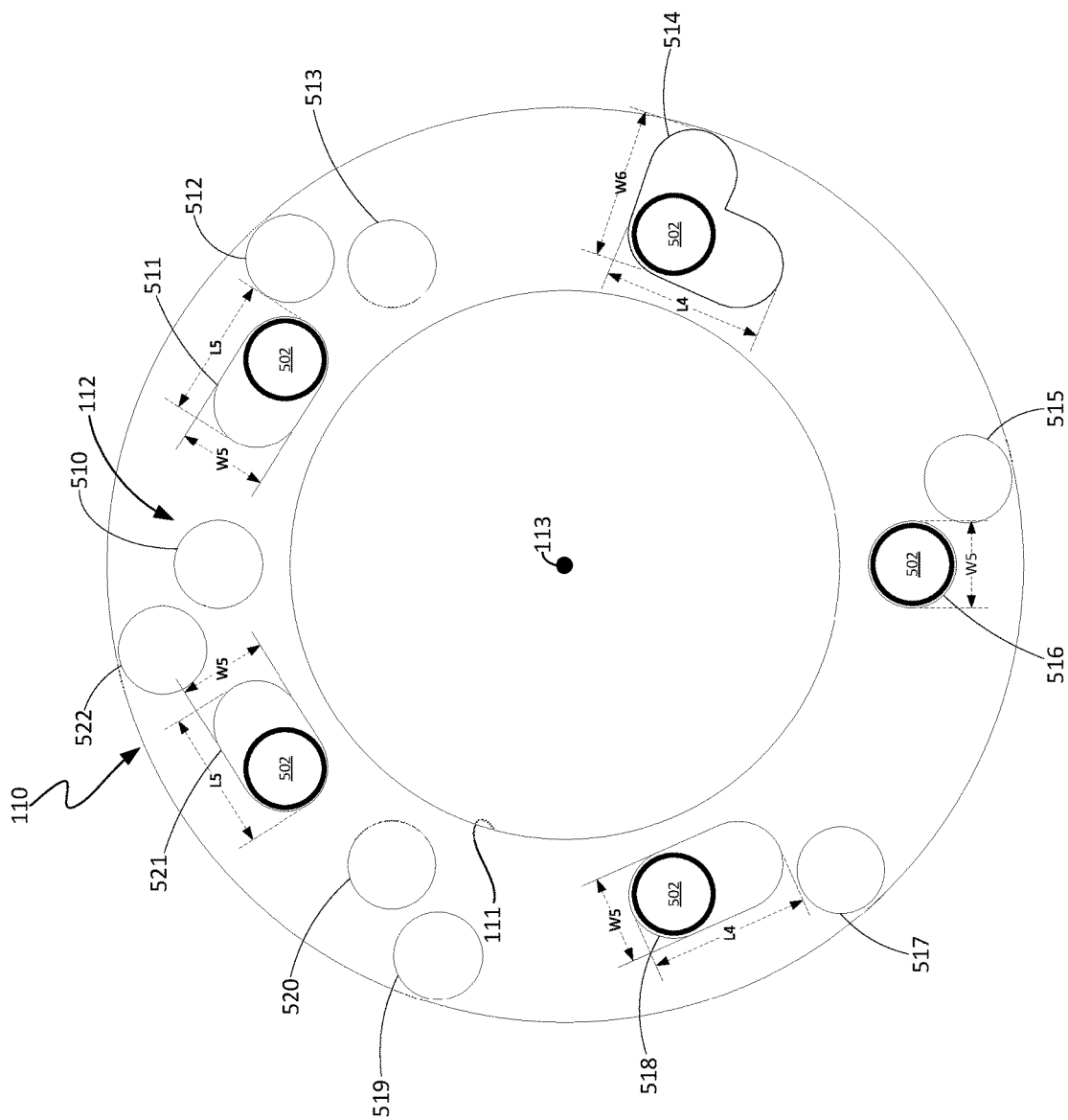
Figure 5D:
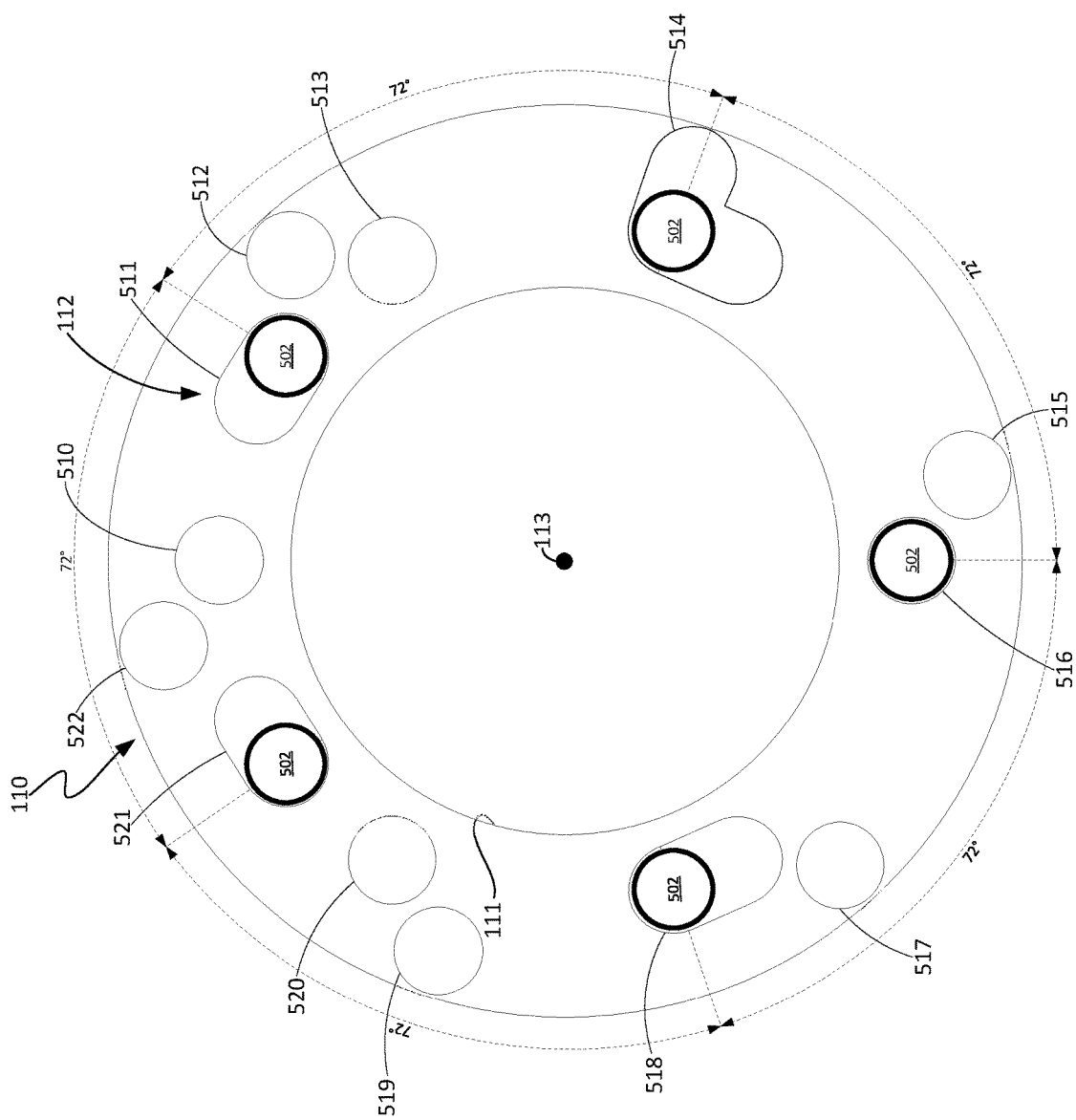

Turning next to FIGS. 5C and 5D, shown are examples of the wheel hub mounting plate 110 in which apertures 511, 514, 516, 518, and 521 are each mated with a lug bolt 502 of a five-lug-bolt pattern of a five-lug-bolt wheel hub. While FIGS. 5C and 5D provide an example of a five-lug-bolt pattern with which the wheel hub mounting plate 110 can mate, the wheel hub mounting plate 110 is adapted to mate with various other five- and six-lug-bolt patterns as well.

FIG. 5C also shows the length and width of apertures 511, 514, 516, 518, and 521. Apertures 511, 516, 518, and 521 can have a fifth width, W5, which can be equal to, or substantially equal to, the diameter of the lug bolts 502, or the lug bolts found on various other wheel hubs. Aperture 514 can have a sixth width, W6, which is greater than the fifth width W5. Apertures 514 and 518 can have a fourth length, L4, which is greater than the fifth width W5 and the sixth width W6. Apertures 511 and 521 can have a fifth length, L5, which is less than the fourth length L4. It should be noted that the fifth width W5, the sixth width W6, and the fourth length L4 shown in FIG. 5C can each be equal to the fifth width W5, the sixth width W6, and the fourth length L4 shown in FIG. 5A, respectively. In some embodiments, W5 can be equal to approximately 17 mm. Apertures 511, 514, 516, 518, and 521 are not, however, limited to having these dimensions or any particular dimensions.

FIG. 5D also shows the angular distance between apertures 511, 514, 516, 518, and 521. In particular, the angular distance between any two adjacent apertures 511, 514, 516, 518, and 521 can be equal to approximately 72°.

Figure 5E:
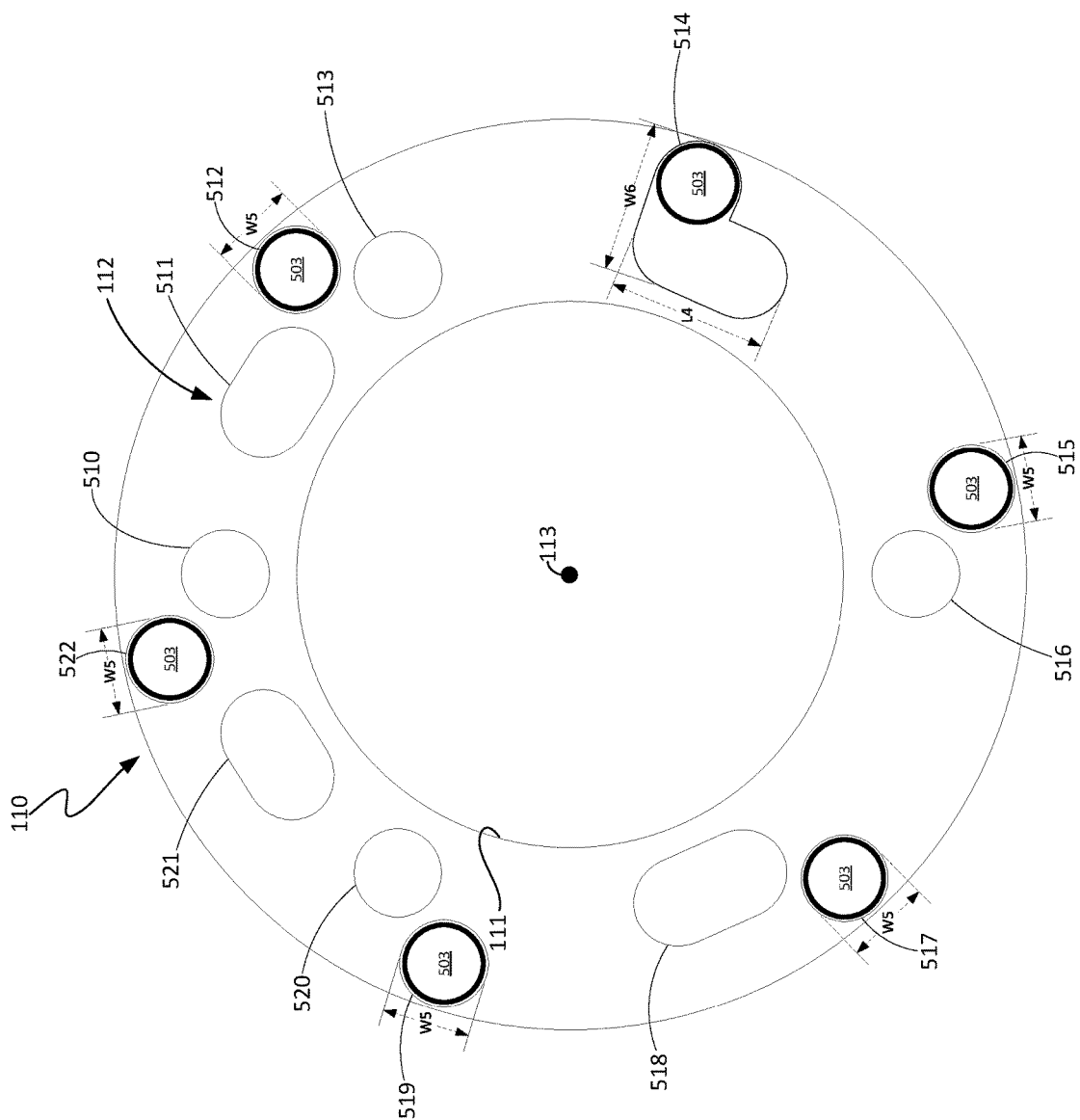
Figure 5F:
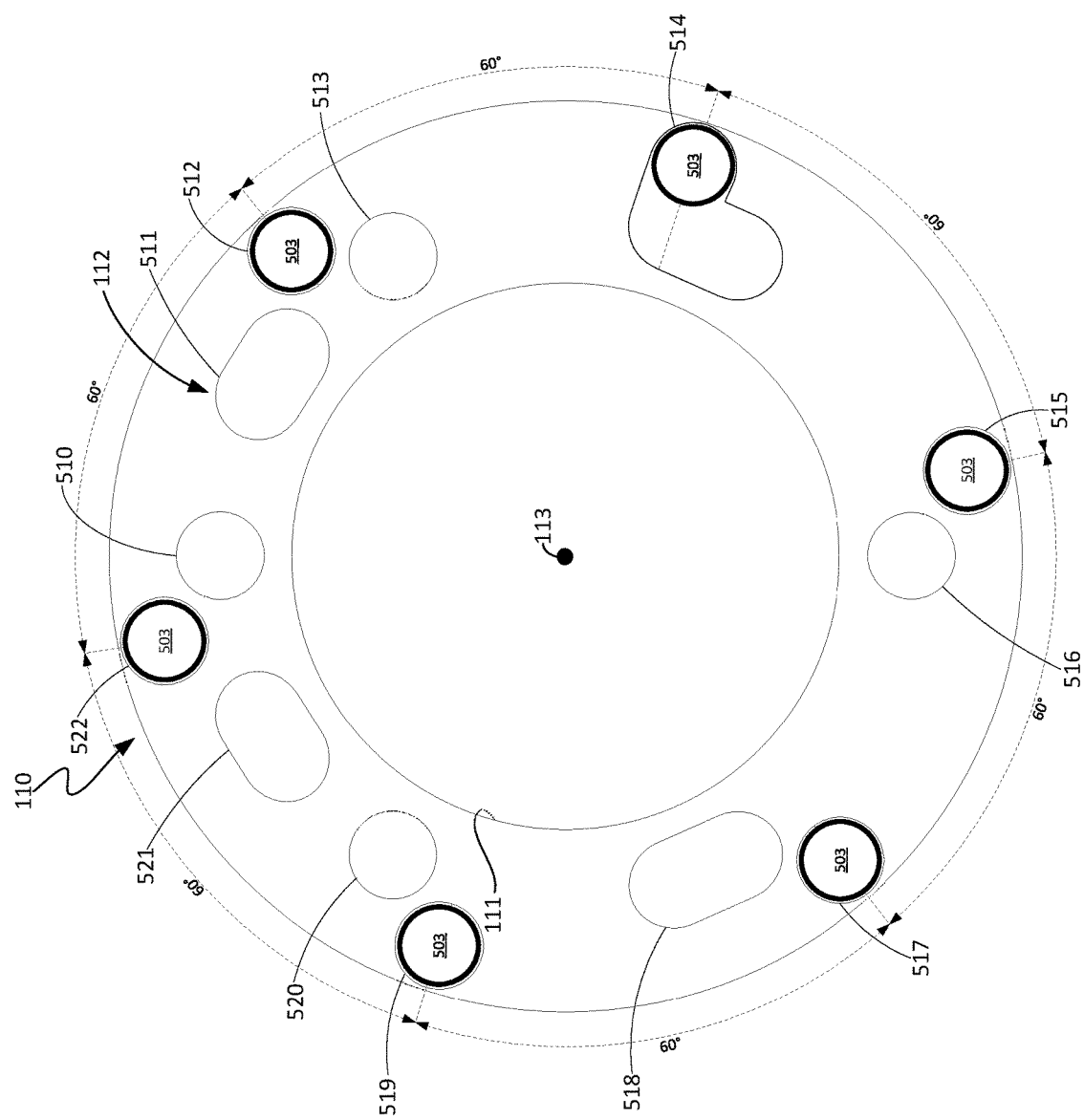

Turning next FIGS. 5E and 5F, shown are examples of the wheel hub mounting plate 110 in which apertures 512, 514, 515, 517, 519, and 522 are each mated with a lug bolt 503 of a six-lug-bolt pattern of a six-lug-bolt wheel hub. While FIGS. 5E and 5F provide examples of a six-lug-bolt pattern with which the wheel hub mounting plate 100 can mate, the wheel hub mounting plate 110 is adapted to mate with various other five- and six-lug-bolt patterns as well.

FIG. 5E also shows the length and width of apertures 512, 514, 515, 517, 519, and 522. Apertures 512, 515, 517, 519, and 522 can have a fifth width, W5, which can be equal to, or substantially equal to, the diameter of the lug bolts 503, or the lug bolts found on various other wheel hubs. Aperture 514 can have a sixth width, W6, which is greater than the fifth width W5. Aperture 514 can have a fourth length, L4, which is greater than the fifth width W5 and the sixth width W6. It should be noted that the fifth width W5, the sixth width W6, and the fourth length L4 shown in FIG. 5E can each be equal to the fifth width W5, the sixth width W6, and the fourth length L4 shown in FIG. 5A, respectively. In some embodiments, W5 can be equal to approximately 17 mm. Apertures 512, 514, 515, 517, 519 are not, however, limited to having these dimensions or any particular dimensions.

FIG. 5F also shows the angular distance between apertures 512, 514, 515, 517, 519, and 522. In particular, the angular distance between any two apertures 512, 514, 515, 517, 519, and 522 can be equal to approximately 60°.

Thus, embodiments of the wheel hub mounting plate shown in FIGS. 5A-5F are adapted to mate with different five-lug-bolt patterns and with different six-lug-bolt patterns. It should be noted, however, that the inventive principles and concepts therein are not limited with respect to the number of lug bolts that can be accommodated or with respect to the number of lug bolt patterns that can be accommodated.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that measurements, amounts, and other numerical data can be expressed herein in a range format. It is also understood that there are a number of values disclosed herein, and that each value is also herein disclosed as "approximately" that particular value in addition to the value itself. For example, if the value "10" is disclosed, then "approximately 10" is also disclosed. Similarly, when values are expressed as approximations, by use of the antecedent "approximately," it will be understood that the particular value forms a further aspect. For example, if the value "approximately 10" is disclosed, then "10" is also disclosed.

As used herein, the terms "about," "approximately," "at or about," and "substantially equal" can mean that the amount or value in question can be the exact value or a value that provides equivalent results or effects as recited in the claims or taught herein. That is, it is understood that amounts, sizes, measurements, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In general, an amount, size, measurement, parameter or other quantity or characteristic is "about," "approximate," "at or about," or "substantially equal" whether or not expressly stated to be such. It is understood that where "about," "approximately," "at or about," or "substantially equal" is used before a quantitative value, the parameter also includes the specific quantitative value itself, unless specifically stated otherwise.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

The invention claimed is:

1. A universal temporary wheel comprising:
   a wheel hub mounting plate comprising a central bore adapted to receive an axle and a pattern of apertures adapted to receive a plurality of different lug bolt patterns of a plurality of respective wheel hubs, each aperture being positioned radially from a center of the universal temporary wheel;
   a wheel disc coupled to the wheel hub mounting plate;
   a rim disposed on an outer perimeter of the wheel disc; and
   an outer casing disposed around an outer perimeter of the rim, the outer casing comprising a tread and at least one rib that is unitary with the outer casing and extends outward from the tread, a length of the at least one rib being perpendicular to a length of the tread, and the at least one rib being adapted to cause the universal temporary wheel to produce a vibration when the at least one rib comes into rolling contact with a hard surface.

2. The universal temporary wheel of claim 1, wherein the outer casing comprises a pneumatic tire.

3. The universal temporary wheel of claim 1, wherein the outer casing comprises solid rubber.

4. The universal temporary wheel of claim 3, wherein the pattern of apertures comprises six apertures, the pattern of six apertures being adapted to receive at least a four-lug-bolt pattern of a four-lug-bolt wheel hub and at least a five-lug-bolt pattern of a five-lug-bolt wheel hub.

5. The universal temporary wheel of claim 4, wherein the at least a four-lug-bolt pattern of a four-lug-bolt wheel hub comprises a first four-lug-bolt pattern of a first four-lug-bolt wheel hub and a second four-lug-bolt pattern of a second four-lug-bolt wheel hub.

6. The universal temporary wheel of claim 5, wherein:
   the first four-lug-bolt wheel hub comprises four lug bolts that are positioned at a first radial distance from a center of the first four-lug-bolt wheel hub; and
   the second four-lug-bolt wheel hub comprises four lug bolts that are positioned at a second radial distance from a center of the second four-lug-bolt wheel hub, the second radial distance being greater than the first radial distance.

7. The universal temporary wheel of claim 4, wherein the at least a five-lug-bolt pattern of a five-lug-bolt wheel hub comprises a first five-lug-bolt pattern of a first five-lug-bolt wheel hub and a second five-lug-bolt pattern of a second five-lug-bolt wheel hub.

8. The universal temporary wheel of claim 7, wherein:
   the first five-lug-bolt wheel hub comprises five lug bolts that are positioned at a first radial distance from a center of the first five-lug-bolt wheel hub; and
   the second five-lug-bolt wheel hub comprises five lug bolts that are positioned at a second radial distance from a center of the second five-lug-bolt wheel hub, the second radial distance being greater than the first radial distance.

9. The universal temporary wheel of claim 1, wherein the pattern of apertures comprises eight apertures, the pattern of eight apertures being adapted to receive at least a five-lug-bolt pattern of a five-lug-bolt wheel hub and at least a six-lug-bolt pattern of a six-lug-bolt wheel hub.

10. The universal temporary wheel of claim 1, wherein the pattern of apertures comprises thirteen apertures, the pattern of thirteen apertures being adapted to receive at least a five-lug-bolt pattern of a five-lug-bolt wheel hub and at least a first six-lug-bolt pattern of a six-lug-bolt wheel hub and second six-lug-bolt pattern of a second six-lug-bolt wheel hub.

11. The universal temporary wheel of claim 1, wherein:
    the central bore has a diameter that is less than 86 mm; and
    the wheel hub mounting plate has an outer diameter that is equal to 160 mm.

12. The universal temporary wheel of claim 1, wherein:
    the central bore has a diameter that equal to approximately 111 mm; and
    the wheel hub mounting plate has an outer diameter that is equal to approximately 175 mm.

13. An apparatus, comprising:
    a wheel hub mounting plate, the wheel hub mounting plate having a central bore adapted to receive an axle;
    a wheel disc coupled to the wheel hub mounting plate;
    a rim disposed on an outer perimeter of the wheel disc;
    an outer casing disposed around an outer perimeter of the rim, the outer casing comprising a tread and at least one rib that is unitary with the outer casing and extends outward from the tread, the at least one rib being adapted to cause the universal temporary wheel to produce an audible vibration when the at least one rib comes into rolling contact with a hard surface; and
    a pattern of six apertures formed on the wheel hub mounting plate, the pattern of six apertures being adapted to receive at least a four-lug-bolt pattern of a four-lug-bolt wheel hub and at least a five-lug-bolt pattern of a five-lug-bolt wheel hub.

14. The apparatus of claim 13, wherein the pattern of six apertures comprises a first set of four apertures having a first shape and a second set of two apertures having a second shape.

15. The apparatus of claim 14, wherein:
the first shape is a substantially discorectangular shape; and
the second shape comprises two substantially discorectangular shapes placed side-by-side and oriented at an acute angle relative to each other that are connected together by a shape that extends laterally between adjacent sides of the discorectangular shapes.

16. The apparatus of claim 14, wherein:
each of the first set of four apertures has a first width; and
each of the second set of four apertures has a second width, the second width being greater than the first width.

17. The apparatus of claim 13, wherein the at least a four-lug-bolt pattern of the four-lug-bolt wheel hub is a first four-lug-bolt pattern of a first four-lug-bolt wheel hub, and the pattern of six apertures is further adapted to receive a second four-lug-bolt pattern of a second four-lug-bolt wheel hub that is different from the first four-lug-bolt pattern.

18. The apparatus of claim 17, wherein:
the first four-lug-bolt wheel hub comprises four lug bolts that are positioned at a first radial distance from a center of the first four-lug-bolt wheel hub; and
the second four-lug-bolt wheel hub comprises four lug bolts that are positioned at a second radial distance from a center of the second four-lug-bolt wheel hub, the second radial distance being greater than the first radial distance.

19. The apparatus of claim 13, wherein the at least a five-lug-bolt pattern of the five-lug-bolt wheel hub is a first five-lug-bolt pattern of a first five-lug-bolt wheel hub, and the pattern of six apertures is further adapted to receive a second five-lug-bolt pattern of a second five-lug-bolt wheel hub.

20. The apparatus of claim 19, wherein:
the first five-lug-bolt wheel hub comprises five lug bolts that are positioned at a first radial distance from a center of the first five-lug-bolt wheel hub; and
the second five-lug-bolt wheel hub comprises five lug bolts that are positioned at a second radial distance from a center of the second five-lug-bolt wheel hub, the second radial distance being greater than the first radial distance.

21. An apparatus, comprising:
a wheel hub mounting plate, the wheel hub mounting plate having a central bore adapted to receive an axle;
a wheel disc coupled to the wheel hub mounting plate;
a rim disposed on an outer perimeter of the wheel disc;
an outer casing disposed around an outer perimeter of the rim, the outer casing comprising a tread and at least one rib that is unitary with the outer casing and extends outward from the tread, the at least one rib being adapted to cause the universal temporary wheel to produce a vibration when the at least one rib comes into rolling contact with a hard surface; and
a pattern of eight apertures formed on the wheel hub mounting plate, the pattern of eight apertures being adapted to receive at least a five-lug-bolt pattern of a five-lug-bolt wheel hub and at least a six-lug-bolt pattern of a six-lug-bolt wheel hub.

22. The apparatus of claim 21, wherein the pattern of eight apertures comprises a first set of four apertures having a first shape, a second set of two apertures having a second shape, and a third set of two apertures having a third shape.

23. The apparatus of claim 22, wherein:
the first shape is a substantially circular shape;
the second shape is a substantially discorectangular shape; and
the third shape is a substantially discorectangular shape that is longer than the second shape.

24. The apparatus of claim 22, wherein:
each aperture of the pattern of eight apertures has a width that is substantially equal to a diameter of a lug bolt;
the second set of two apertures have a length that is greater than the width of each aperture of the pattern of eight apertures; and
the third set of two apertures have a length that is greater than the length of the second set of two apertures.

25. An apparatus, comprising:
a wheel hub mounting plate, the wheel hub mounting plate having a central bore adapted to receive an axle;
a wheel disc coupled to the wheel hub mounting plate;
a rim disposed on an outer perimeter of the wheel disc;
an outer casing disposed around an outer perimeter of the rim, the outer casing comprising a tread and at least one rib that is unitary with the outer casing and extends outward from the tread, the at least one rib being adapted to cause the universal temporary wheel to produce a vibration when the at least one rib comes into rolling contact with a hard surface; and
a pattern of thirteen apertures formed on the wheel hub mounting plate, the pattern of thirteen apertures being adapted to receive at least a five-lug-bolt pattern of a five-lug-bolt wheel hub and at least a six-lug-bolt pattern of a six-lug-bolt wheel hub.

26. The apparatus of claim 25, wherein the pattern of thirteen apertures comprises a first set of nine apertures having a first shape, a second set of two apertures having a second shape, a third set of one aperture having a third shape, and fourth set of one aperture having a fourth shape.

27. The apparatus of claim 26, wherein:
the first shape comprises a substantially circular shape;
the second shape comprises a substantially discorectangular shape;
the third shape comprises a substantially discorectangular shape that is longer than the second shape; and
the fourth shape comprises two substantially discorectangular shapes oriented at a right angle relative to each other that are connected together.

28. The apparatus of claim 26, wherein:
the first set of nine apertures, the second set of two apertures, and the third set of one aperture have a width that is substantially equal to a diameter of a lug bolt;
the second set of two apertures have a length that is greater than the width of the first set of nine apertures, the second set of two apertures, and the third set of one aperture;
the third set of one aperture has a length that is greater than the length of the second set of two apertures;
the fourth set of one aperture has a width that is greater than the width of the first set of nine apertures, the second set of two apertures, and the third set of one aperture; and
the fourth set of one aperture has a length that is greater than the length of the third set of one aperture.

29. The universal temporary wheel of claim 1, wherein the vibration comprises an audible sound.

30. The universal temporary wheel of claim 21, wherein the vibration comprises an audible sound.

31. The universal temporary wheel of claim 25, wherein the vibration comprises an audible sound.

\* \* \* \* \*